United States Patent [19]
Taffin

[11] Patent Number: 6,044,317
[45] Date of Patent: Mar. 28, 2000

[54] METHOD FOR ELIMINATING INSTABILITY IN A VEHICLE AUTOMATIC TRANSMISSION WHICH CONSTANTLY SHIFTS FROM ONE SPEED RATIO TO THE HIGHER RATIO AND CONVERSELY

[75] Inventor: Christian Taffin, Chatou, France

[73] Assignee: Renault, Boulogne-Billancourt, France

[21] Appl. No.: 09/011,063

[22] PCT Filed: Aug. 2, 1996

[86] PCT No.: PCT/FR96/01232

§ 371 Date: Apr. 27, 1998

§ 102(e) Date: Apr. 27, 1998

[87] PCT Pub. No.: WO97/06374

PCT Pub. Date: Feb. 20, 1997

[30] Foreign Application Priority Data

Aug. 10, 1995 [FR] France .................................. 95 09740

[51] Int. Cl.[7] .............................. G06F 17/00; G06F 19/00; G06F 7/00
[52] U.S. Cl. ................................ 701/57; 701/51; 701/110; 477/34; 477/68
[58] Field of Search .................................. 701/51, 52, 57, 701/65, 110; 477/34, 37, 68

[56] References Cited

U.S. PATENT DOCUMENTS 5,067,374  11/1991  Sakai et al. ................................ 701/57
5,079,705   1/1992  Sakai et al. ................................ 701/57
5,479,345  12/1995  Amsallen ................................... 701/59

Primary Examiner—William A. Cuchlinski, Jr.
Assistant Examiner—Gertrude Arthur
Attorney, Agent, or Firm—Oblon, Spivak, McClelland, Maier & Neustadt, P.C.

[57] ABSTRACT

The method for eliminating an oscillation phenomenon in a motor vehicle with an automatic transmission system. The mass of the vehicle is determined on the basis of the measured speed, the current ratio of the transmission, the engine speed and the opening angle of the engine throttle. The acceleration of the vehicle and a higher ratio is predicted from the mass of the vehicle. The total amount of tractive resistance applied to the vehicle is determined. The probability that there will be an oscillation phenomenon at a higher ratio termed "oscillation risk" is determined from the acceleration and tractive resistance information. A signal for preventing shifting to the higher ratio is generated from the oscillation risk information, with the signal being adapted to be applied to a transmission control device.

20 Claims, 3 Drawing Sheets

METHOD FOR ELIMINATING INSTABILITY IN A VEHICLE AUTOMATIC TRANSMISSION WHICH CONSTANTLY SHIFTS FROM ONE SPEED RATIO TO THE HIGHER RATIO AND CONVERSELY

BACKGROUND OF THE INVENTION

1. Field of the Invention

This invention concerns a method of elimination of the phenomenon of pumping of a motor vehicle with automatic transmission, as well as a motor vehicle employing that method.

2. Discussion of the Background

The pumping phenomenon is common in the field of motor vehicles with automatic transmission. It involves an instability of the automatic transmission, which in some circumstances changes constantly from one ratio to the higher ratio and vice versa.

This phenomenon generally occurs when a vehicle equipped with an automatic transmission is subjected to a certain level of resistant forces caused, in practice, by a sloping road, a presence of very strong wind, a sizable load of the vehicle, or even when the vehicle is traveling at a high altitude, that is, under relatively weak atmospheric pressures.

A theoretical solution to this problem consists in preventing any shift to the higher gear ratio if the acceleration of the vehicle on that higher ratio would be negative, and if the vehicle is subjected to strong resistant forces.

A partial solution to the pumping problem was introduced, in practice, by the method of adaptive scheduling of shifting down, described in patent U.S. Pat. No. 5,241,476 of the Chrysler Corporation. According to that document, the method consists in determining whether the vehicle could maintain its speed on the higher ratio and, if not, preventing the shift from the higher ratio. That method resorts to the calculation of acceleration of the vehicle on the higher ratio, but without precisely knowing the weight of the vehicle. The result of the determination is therefore erroneous. Furthermore, according to that document, only cases of pumping between third and fourth gear are eliminated, while the other cases of pumping can occur.

In addition, this method consists in locking the ratio engaged if the calculations lead to an acceleration that would be negative on the higher ratio. That criterion leads to untimely lockings on the ratio engaged, once the acceleration value calculated is slightly negative. Likewise, if acceleration ranges around zero, it would be randomly switched from a nonlocking condition to a locking condition, and so on.

SUMMARY OF THE INVENTION

The invention is, consequently, intended to propose a method of driving the gear of a vehicle with automatic transmission, making it possible to avoid the pumping phenomenon efficiently, regardless of the ratio engaged and the number of gear ratios.

Another object of the invention is to propose a method making possible a less erratic determination of the pumping risk, so as to optimize operation of the automatic transmission.

For that purpose, the invention concerns a method of elimination of the phenomenon of pumping of a motor vehicle with automatic transmission, characterized in that it includes the stages consisting of:

determining the weight of the vehicle, by using the measured speed of the vehicle, the current transmission ratio, the engine speed and the angle of opening of the engine throttle valve;

determining from the weight of the vehicle the acceleration that the vehicle would experience on the higher ratio;

determining the sum of the resistant forces applied to the vehicle;

from the information on acceleration and resistant forces, determining the possibility of having a pumping phenomenon on the higher ratio, called "pumping risk;"

from the "pumping risk" information, elaborating a signal preventing shift from the higher ratio, intended to be applied to the transmission control system.

According to other characteristics of the method of the invention:

in order to determine the possibility of having a pumping phenomenon on the higher ratio, a fuzzy logic technique is used, including the stages consisting of:

determining the degree of membership of potential acceleration on the higher ratio in a negative fuzzy subsystem defined by a given acceleration threshold;

determining the degree of membership of the resistant forces in a positive fuzzy subsystem defined by a lower threshold of resistant forces and by a higher threshold of resistant forces;

from the degrees of membership in the fuzzy subsystems, determining the pumping risk on the higher ratio as being the minimum value of torque of the degrees of membership;

the lower and higher thresholds of resistant forces and/or the threshold of acceleration on the higher ratio are determined by an adjustment and depend on the current ratio engaged;

determination of the weight of the vehicle includes the stages consisting of:

calculating the acceleration of the vehicle from the measured speed of the vehicle;

calculating the wheel torque from the angle of opening of the throttle valve, engine speed and reduction ratio of the transmission on the current ratio;

determining a series of p variations of acceleration and torque between two given times;

calculating the weight of the vehicle by a technique of identification of recursive least squares of the variations of acceleration and torque.

the stage of calculation of the weight of the vehicle includes a stage of calculation of a gross weight calculated for each variation of acceleration and torque, followed by a stage of calculation of weight by calculation of a recursive average from the successive gross weight information.

the stage of calculation of acceleration of the vehicle from the measured speed of the vehicle includes the stages consisting of:

filtering the measured speed information by means of a first-order digital low-pass filter, so as to obtain filtered speed information;

calculating the numerical derivative of the filtered speed information so as to obtain vehicle acceleration information;

filtering the vehicle acceleration information by means of a digital low-pass filter, so as to obtain filtered acceleration information from the vehicle.

the stage of calculation of the wheel torque includes the stages consisting of:

calculating the wheel torque by multiplying the gear reduction ratio of the vehicle on the current ratio by the engine torque;

filtering the wheel torque by means of the low-pass filters so as to obtain wheel torque information in phase with the filtered acceleration information from the vehicle;

the series of p variations of acceleration and torque is calculated between two times spaced by approximately 0.5 second to 2.5 seconds;

the recursive least squares of the variations of acceleration and torque are calculated for variations of acceleration and torque obtained when the brakes of the vehicle are not activated, when the variation of angle of opening of the throttle valve between the given times is below a predetermined threshold, and when the products of the variations of torque by the variations of acceleration are higher than a predetermined positive threshold.

The invention also concerns a motor vehicle employing the method of elimination of the pumping phenomenon, having the above characteristics.

BRIEF DESCRIPTION OF THE DRAWINGS

The invention will be better understood by referring to the following specification, given by way of nonlimitative example and to the attached drawings, wherein.

DISCUSSION OF THE PREFERRED EMBODIMENTS

Figure 1:
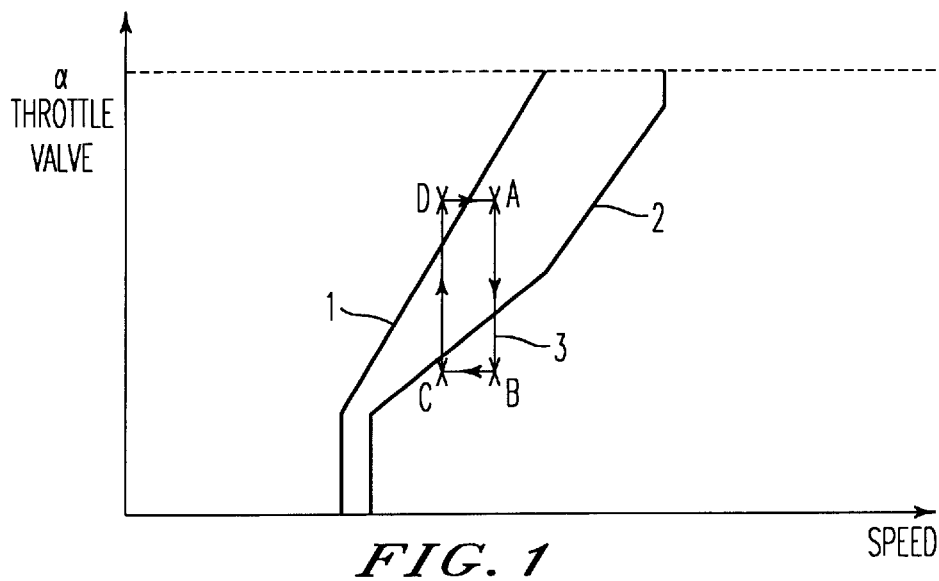
FIG. 1 represents, in a graph of the angle of opening of the throttle valve as a function of speed of the vehicle, a characteristic cycle of the pumping effect.

Reference is made to FIG. 1. The standard cycle of a pumping phenomenon has been represented on this figure in a graph representing the angle $\alpha_{pap}[\alpha_{throttle\ valve}]$ of opening of the throttle valve as a function of speed of the vehicle. That figure shows two curves 1 and 2 of change of gear ratios of the vehicle, from ratio N to ratio N−1 (curve 1) and from ratio N to ratio N+1 (curve 2) respectively, and a typical ABCD cycle 3 characteristic of the pumping phenomenon.

Starting from an operating point A corresponding to a gear ratio N, the driver judges that the speed of the vehicle is high enough and lifts his foot from the accelerator, which diminishes the angle $\alpha_{pap}$ and corresponds to the shift to point B of the cycle. On doing so, the cycle crosses curve 2 and, consequently, the higher ratio N+1 is engaged; for example, the fourth gear is engaged if the third was engaged. If the driver can maintain the speed of the vehicle on this new ratio, there is no particular problem.

On the other hand, when the sum of the resistant forces applied to the vehicle is relatively high, the vehicle cannot maintain its speed on ratio N+1. The speed diminishes, and when point C is reached, the driver reaccelerates. The angle $\alpha_{pap}$ widens, and the operating point passes to point D of the cycle. On doing so, the cycle crosses curve 1, so that ratio N−1 is engaged.

The resulting acceleration is then expressed by an increase of speed, so that point A is reached again. That ABCD cycle characterizes pumping and gives rise to an uncomfortable and inefficient drive in a vehicle with automatic transmission.

Figure 2:
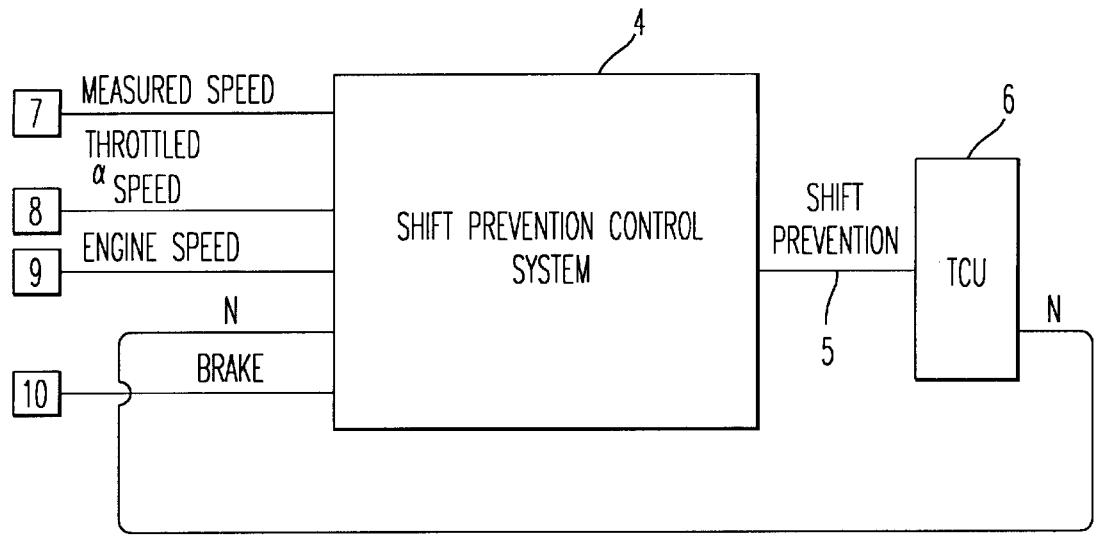
FIG. 2 represents a partial schematic view of a motor vehicle employing the method of elimination of pumping on fuzzy logic according to the invention.

To remedy that problem, the invention provides a method of elimination of pumping, depicted in FIG. 2 in conjunction with the corresponding functional elements of a motor vehicle. That method employs the elaboration by functional block 4, and according to a method indicated in FIG. 3 and detailed below, of a variable 5 preventing shift to the higher ratio, which is used by a functional block 6 representing the gear control unit, which decides the ratio N to be applied to the automatic transmission (not represented). Functional block 6 integrates a control logic by itself known, which receives binary type information (0 or 1) preventing or allowing the shift to the higher ratio, that information being managed by functional block 6 for engagement of the gears.

Functional block 4, which is an electronic logic system, the construction of which is evident simply from its functions, is a block which generates the information preventing shift 5 from information emanating from sensors 7, 8, 9, 10 associated with the vehicle, those sensors comprising a speed sensor indicated by 7 and supplying the measured speed of the vehicle, called $V_{mes}$ [$V_{measured}$], a sensor 8 measuring the angle of opening $\alpha_{pap}$ of the throttle valve of the vehicle, a sensor 9 measuring the rotary speed of the engine, called $N_{mot}[N_{engine}]$, and a braking sensor 10 indicating in binary fashion whether the driver is braking or not at the time considered. Block 4 further receives from block 6 information indicating the ratio N applied to the automatic transmission.

Figure 3:
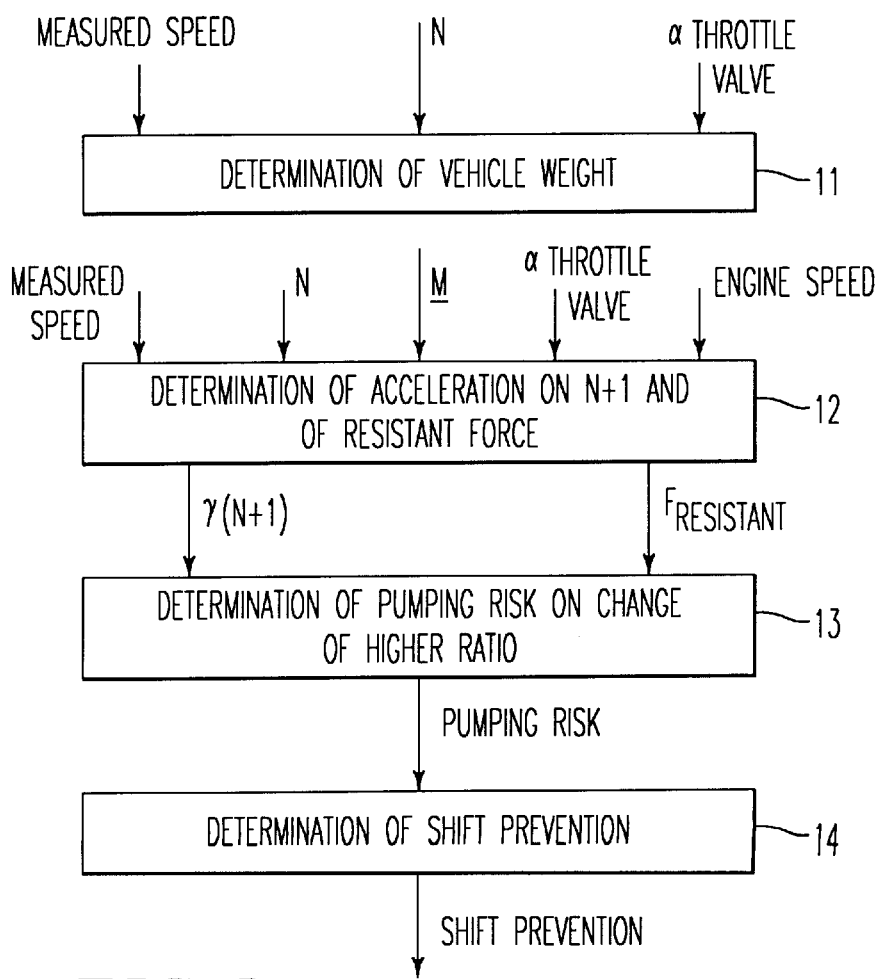
FIG. 3 represents a general organization chart of the stages of the method of elimination of pumping according to the invention.

FIG. 3 details the mode of elaboration by block 4 of FIG. 2 of the variable preventing shift to the higher ratio. The different blocks represented correspond to stages of the method according to the invention, but it can be noted that they may also represent the calculation blocks of a system capable of using the method. Those calculation blocks can easily be constructed by the expert from their functions described here. Consequently, the calculation blocks will not be described in detail.

The first stage consists of determining, in block 11, the weight M of the vehicle, that information then being transmitted to block 12. The latter determines the acceleration $\gamma(N+1)$ that the vehicle would undergo on the higher ratio N+1, that acceleration being determined, notably, from the weight M of the vehicle, the source of which will be explained in connection with FIG. 6. Block 12 also determines an evaluation of the sum of the resistant forces $F_{resistant}$.

With these two pieces of information $\gamma(N+1)$ and $F_{resistant}$, block 13 determines the risk or possibility of pumping that might exist on the higher ratio N+1, called "pumping risk" and the value of which ranges between 0 and 1, where 0 corresponds to the absence of pumping and where "1" corresponds to a certain probability.

Block 14 determines the shift prevention signal, which bars change to any higher ratio.

Figure 6:
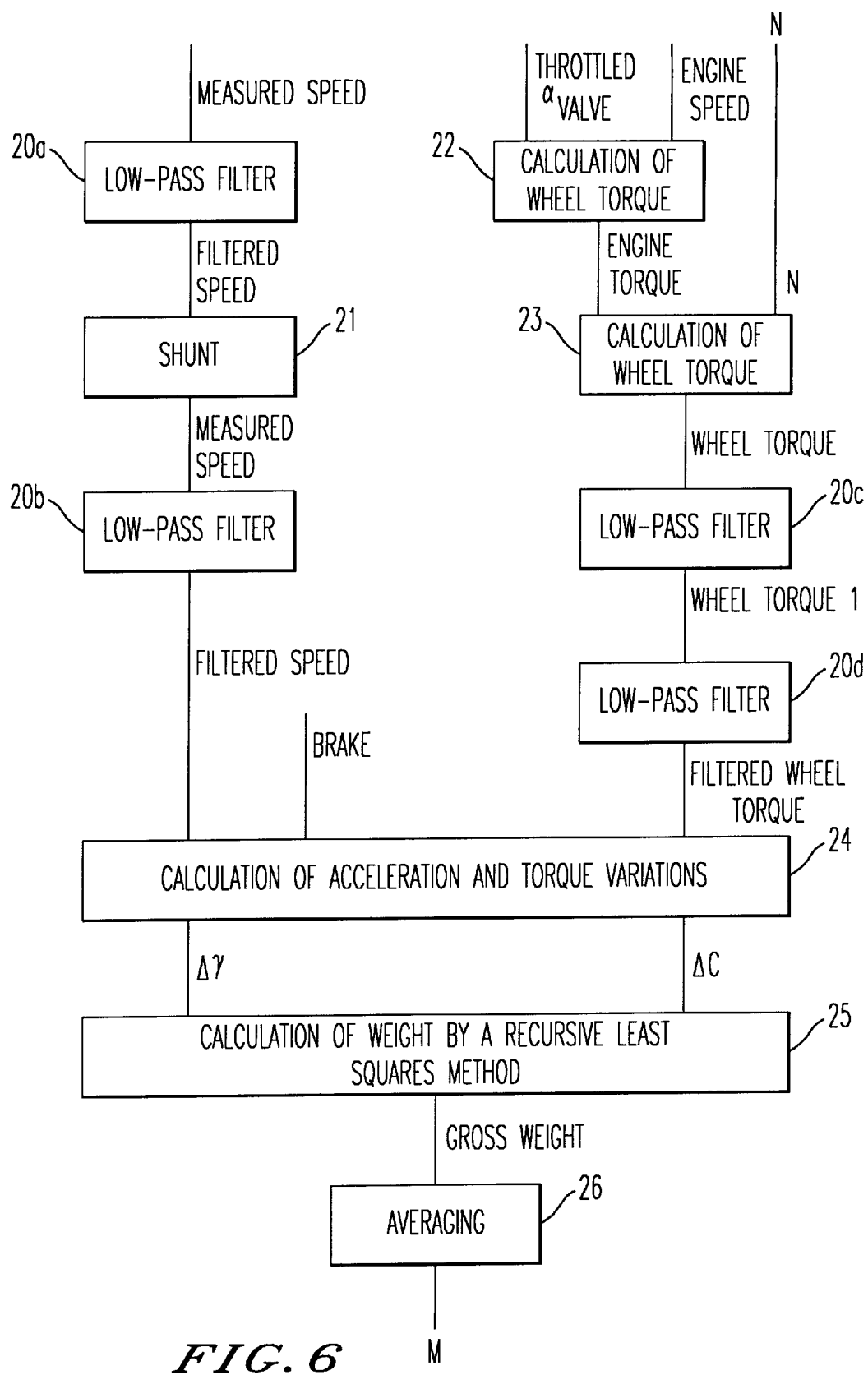
FIG. 6 represents an organization chart of the stages of the method of determination of weight of the vehicle.

The invention provides for determination of the weight M of the vehicle to be made according to a method whose stages are depicted in FIG. 6. In that figure the speed $V_{mes}$ of the vehicle, as measured by sensor 7, is filtered in filtering block 20a, employing a first-order low-pass digital filter, which delivers filtered speed information $V_{fil}$ calculated from the speed $V_{mes}$ by means of the following recursion formula:

$$V_{fil}(t)=K.V_{fil}(t-Te)+(1-K).V_{mes}(t), \qquad (1)$$

in which t is the current sampling time, t−Te the previous sampling time, Te the sampling period, and K the filtering constant of the filter calculated according to the following expression:

$$K=exp.(-2\pi.fc.Te), \qquad (2)$$

where fc is the cutoff frequency of the filter and exp designates the exponential function. Block 21 processes the filtered speed information $V_{fil}$ so as to calculate the acceleration $\gamma_{mes}$ of the vehicle by means of the standard numerical derivation formula:

$$\gamma_{mes}(t)=[V_{fil}(t)-V_{fil}(t-Te)]/Te \qquad (3).$$

That information $\gamma_{mes}$ representing the acceleration of the vehicle is then filtered by means of filtering block 20b, which has the same function as block 20a, so as to deliver the information $\gamma_{fil}$ representing the filtered acceleration of the vehicle. Block 22 determines from information $\alpha_{pap}$ (angle of opening of the throttle valves) and $N_{mot}$ (rotary speed of engine) a value representing the engine torque, which can be obtained, for example, by a reading interpolated in a chart. For reasons of good convergence of the method of calculation of weight, it is necessary for engine torque precision to be good.

Block 23 makes it possible to determine the wheel torque of the vehicle from the engine torque and gear ratio N by means of formula:

$$C_{roue}(N)=rap(N).C_{mot}[C_{wheel}(N)=rap(N).C_{engine}] \qquad (4)$$

in which rap(N) is the gear reduction ratio on ratio N and $C_{mot}$ the engine torque.

This wheel torque value is filtered two consecutive times by filtering block 20c, which delivers information $C_{roue.fil}$ [$C_{wheel.fil}$].

Blocks 20c and 20d have the same function as block 20a and are mainly intended to bring the two pieces of information $\gamma_{fil}$ and $C_{roue.fil}$ into phase for the treatments to be applied to them.

Block 24 has the function, among others, of calculating the variations of torque and acceleration noted as $\Delta C$ and $\Delta \gamma$, which will feed the block 25 calculating the weight of the vehicle M by an identification technique of recursive least squares. In fact, between two times $t_1$ and $t_2$ close enough for the variations of torque and acceleration to be significant and slightly distant enough for little or no variation of the resistant forces, the relation joining $\Delta C$ to $\Delta \gamma$ is:

$$M.\Delta\gamma=\Delta C/radius, \qquad (5)$$

where radius designates the wheel radius.

The method of recursive least squares used in block 25 makes it possible to calculate from a set of P measurements of variations of torque and acceleration $\Delta C(i)$ and $\Delta \gamma(i)$, i being the index of measurement, to determine the parameter M which minimizes the quadratic criterion:

$$J=\Sigma(i=1 \text{ at } i=p) \ (M.\Delta\gamma(i)-\Delta C(i)/radius)^2 \qquad (6).$$

This method of identification is described, for example, in the work entitled "Identification et commande des systèmes" [System identification and control] by Ioan Doré Landau, Editions Hermès, 1988, pages 177 to 208. Block 24 has the function of determining the "good" variations of torque and acceleration, so that a good torque ($\Delta\gamma$, $\Delta C$) is defined by the following conditions (7), placing:

$\Delta\gamma=\gamma(t_2)-\gamma(t_1)$ between two times $t_2$ and $t_1$ $\Delta C=C_{roue}(t_2)-C_{roue}(t_1)$ $$\Delta\gamma. \Delta C>SC_\gamma>0 \qquad (7)$$

and $0.5 \ s<t_2-t_1<2.5 \ s$ and brake=0 and $|d(\alpha_{pap})dt|_{t1.t2}<S_{d\alpha}$

The above conditions signify:

that a pair of measurements $\Delta C$ and $\Delta \gamma$ is judged good when the product $\Delta C.\Delta \gamma$ is higher than a threshold called positive $SC\gamma$, which makes it possible to ensure that the variations of torque and acceleration are of the same sign and correspond to a minimal "excitation" sufficient for identification;

that the calculations of variations $\Delta C$ and $\Delta \gamma$ correspond to points at least 0.5 s away in order to observe significant variations and at most 2.5 s away for the variations of resistant forces not to influence the identification procedure;

that the brakes are not activated, for the brakes would create unknown and variable resistant forces;

that the variation of the angle of opening of the throttle valve at times $t_1$ and $t_2$ is slight (that is, that the derivative of $\alpha_{pap}(t)$ is less than a threshold $Sd\alpha_1$ for the calculations of engine torque from charts at times $t_1$ and $t_2$ will be correct only if they correspond to stable points.

Block 25 has the function of calculating the weight of the vehicle, called $M_{brute}[M_{gross}]$ by an identification technique of recursive least squares with constant gain, described in the above-mentioned work by Landau, the procedure of which, applied to the present case, is as follows:

Let M'(t−1) be the estimated weight at the previous time of sampling t−1. The standard deviation, called $\epsilon_{norm}$, is calculated from a new pair of points of measurement of variations of torque and acceleration ($\Delta C, \Delta\gamma$), using the expression:

$$\epsilon_{norm}=[(\Delta C/radius)-M'(t-1).\Delta\gamma]/(1+f.\Delta\gamma^2), \qquad (8)$$

expression in which f is the adaptation gain, which is constant.

The calculation of weight at the current sampling time t results then from the following expression (9):

$$M_{brute}=M'(t)=M'(t-1)+f.\Delta\gamma.\epsilon_{norm} \qquad (9).$$

Block 25, which delivers information $M_{brute}$, is called every time information $(\Delta C, \Delta\gamma)$ can be delivered by block 24.

Block 26 carries out averaging (which is not temporal) every time new information $M_{brute}$ is delivered by block 25, which is at the rate of the flow of information from block 24. That block 26 delivers the information called M (average weight) which is calculated from the gross weight $M_{brute}$ coming from block 25 thanks to expression (10):

$$M(t)=1/(Nb-pt+1).[Nb-pt.M(t-1)+M_{brute}], \qquad (10)$$

expression in which Nb–pt is the number of times new information $M_{brute}$ is available, and which is incremented by 1 on each call. M(t–1) is the average weight at the previous call time t–1, and M(t) is the average weight at the current call time t.

This determination of weight M of the vehicle is used in block 12 of FIG. 3, notably, to determine the acceleration the vehicle would have on ratio N+1.

In block 12 of FIG. 3 this acceleration, called $\gamma(N+1)$, as well as the resistant force called $F_{resistant}$, are determined as follows:

$$\gamma(N+1)=\gamma_{mes}+[C_{roue}(N+1)-C_{roue}(N)/(radius.M) \qquad (11)$$

and $$F_{resistant}=\gamma_{nom}(\alpha_{pap}, V_{mes}, N, N_{mot})-\gamma_{mes}, \qquad (12)$$

in which expressions:

$\gamma_{mes}$ is the real acceleration of the vehicle, calculated from the speed of the vehicle by a filtering and derivation procedure analogous to that described concerning blocks 60 and 21 of FIG. 6:

$C_{roue}$ (N) and $C_{roue}$(N+1) are respectively the wheel torques that the vehicle presents on ratio N and would have on ratio N+1. $C_{roue}$(N) is calculated by a procedure identical to that described in blocks 22, 23 and 20c of FIG. 6. $C_{roue}$(N+1) is calculated in a manner analogous to $C_{roue}$(N), being careful to calculate the speed the engine would have on ratio N+1:$N_{mot}$(N+1)=rap (N+1).$V_{mes}$/radius, which serves to determine the engine torque $C_{mot}$(N+1) the engine would have on ratio N+1. The wheel torque on ratio N+1 is then deduced from the expression:

$$C_{roue}(N+1)=C_{mes}(N+1).rap(N+1), \qquad (13)$$

rap(N+1) being the reduction ratio on ratio N+1.

Let M be the weight of the vehicle, as calculated in block 11 of FIG. 3, "radius" the radius of the wheels of the vehicle and $\gamma_{nom}(\alpha_{pap}, V_{mes}, N, N_{mot})$ the nominal acceleration to which the vehicle would be subject if it were running on flat terrain, without wind and with a standard weight empty. The nominal acceleration is calculated by means of the following expression (14)

$$\gamma_{non}=C_{roue}(N)/radius.M_{avide}-T_{aero}/M_{avide}-T_{rout}M_{avide} \qquad (14)$$

in which:

$M_{a}$vide is the weight of the vehicle empty $T_{aéro}$ is the aerodynamic drag:

$T_{aéro}=1/2.\rho.Scx.V^2_{mes}$, $\rho$ being the air density and Scx the air penetration coefficient of the vehicle;

$T_{roul}$ is the rolling drag: $T_{roul}=M_{a}$vide.g.kr, where g is the acceleration due to gravity (g=9.81 m/s$^2$) and kr the rolling resistance coefficient.

The two pieces of information $\gamma(N+1)$ and $F_{resistant}$, calculated in block 12 of FIG. 3, make it possible, on the one hand, to predict whether the acceleration on ratio N+1 can be negative and, on the other, to verify whether the vehicle is subjected to resistant forces. Those two pieces of information are, consequently, processed in block 13 of FIG. 3 by a so-called fuzzy logic technique, in order to determine the pumping risk that would exist if the gear control unit (block 32 of FIG. 2) decided to change the higher ratio N+1, which is called pumping risk.

Figure 4:
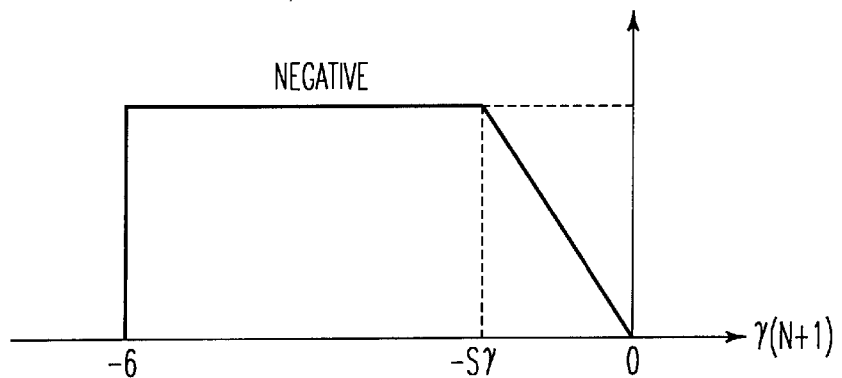
FIG. 4 represents a graph of the function of membership of acceleration on the higher ratio $\gamma(N+1)$ in the negative fuzzy subsystem.

According to this invention, one determines the degree of membership of $\gamma(N+1)$ in the negative $\gamma(N+1)$ fuzzy subsystem represented in FIG. 4, in which $S_\gamma$ is a threshold determined by the adjuster, and which can be a function of the ratio engaged. That degree of membership is called $\mu_\gamma$.

Figure 5:
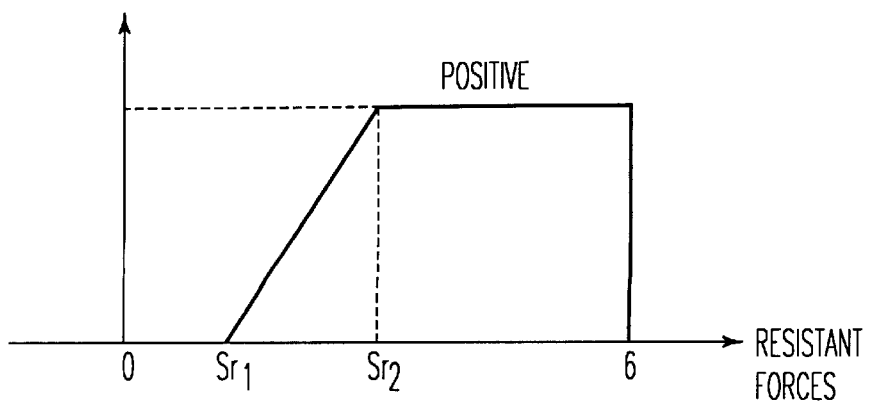
FIG. 5 represents a graph of membership of the resistant force $F_{resistant}$ in the positive fuzzy subsystem.

One also determines the degree of membership, called $\mu_{Fr}$, of $F_{resistant}$ in the positive $F_{resistant}$ fuzzy subsystem in FIG. 5, in which the thresholds $S_{r1}$ and $S_{r2}$ are to be determined by the adjuster and can be a function of the ratio engaged.

Having determined the degrees of membership $\mu_\gamma$ and $\mu_{Fr}$, the pumping risk is determined on the higher ratio as follows:

$$\text{pumping risk}=\text{Min}(\mu_\gamma,\mu_{Fr}), \qquad (15)$$

where Min designates the operator "minimum." That pumping risk, represented by the output of block 13, is processed in block 14 to determine the shift prevention information, which is going to prevent shift to the higher ratio in the gear control unit as follows: as soon as the pumping risk is higher than threshold $S_{r1}$, the shift prevention becomes active, that is, the shift prevention is at 1. That prevention is deactivated when the pumping risk is below $S_{r2}$. In that case, the shift prevention signal is at 0. $S_{r1}$ and $S_{r2}$ are both thresholds determined by the adjuster to regulate the sensitivity of the pumping risk detection procedure.

It is evident from the foregoing that the invention responds perfectly to the objectives set. It remedies the problems of the known methods and eliminates the pumping phenomenon, regardless of the number of gear ratios and the ratio engaged. Furthermore, the fuzzy logic calculations make it possible to avoid any test of existence of all-or-nothing pumping, which is particularly apt to lead to erratic functioning of the gear.

By calculating the sum of the resistant forces applied to the vehicle, the method also makes it possible to verify whether the vehicle is under the probable conditions of pumping.

Finally, the method according to the invention also makes possible a more precise calculation of the weight of the vehicle in dynamic fashion.

I claim:

1. Method of elimination of the phenomenon of pumping of a motor vehicle with automatic transmission, by elaboration of a signal preventing change from a higher ratio, intended to be applied to a transmission control system, characterized in that:

the weight of the vehicle is determined by using the measured speed of the vehicle, the current transmission ratio, the engine speed and the angle of opening of the engine throttle valve, and taking into account the state of the brakes, the acceleration that the vehicle would experience on a higher transmission ratio is determined from the weight of the vehicle, the sum of the resistant forces applied to the vehicle is determined, the possibility of having a pumping phenomenon on the higher ratio transmission, called "pumping risk," is determined from the information on acceleration and resistant forces, and the prevention signal is elaborated from the "pumping risk" information.

2. Method according to claim 1, characterized in that in order to determine the probability of having a pumping phenomenon on the higher transmission ratio, a fuzzy logic technique is used, including the stages consisting of:

determining the degree of membership of potential acceleration on the higher ratio in a negative fuzzy subsystem defined by a given acceleration threshold;

determining the degree of membership of the resistant forces in a positive fuzzy subsystem defined by a lower threshold of resistant forces and by a higher threshold of resistant forces;

from the degrees of membership in the fuzzy subsystems, determining the pumping risk on the higher transmission ratio as being the minimum value $\text{Min}(\mu_\gamma, \mu_{Fr})$ of torque of the degrees of membership.

3. Method according to claim 2, characterized in that the determination of the weight of the vehicle includes the stages consisting of:

calculating the acceleration of the vehicle from the measured speed of the vehicle;

calculating the wheel torque from the angle of opening of the throttle valve, engine speed and reduction ratio of the transmission of the current ratio;

determining a series of p variations of acceleration and torque between two given times;

calculating the weight of the vehicle by a technique of identification of recursive least squares of the variations of acceleration and torque.

4. Motor vehicle, characterized in that it employs the method of elimination of the pumping phenomenon according to claim 2.

5. Method according to claim 2, characterized in that the lower threshold and higher threshold of resistant forces and/or the threshold of acceleration on the higher ratio are determined by an adjustment and depend on the current ratio engaged.

6. Method according to claim 5, characterized in that the determination of the weight of the vehicle includes the stages consisting of:

calculating the acceleration of the vehicle from the measured speed of the vehicle;

calculating the wheel torque from the angle of opening of the throttle valve, engine speed and reduction ratio of the transmission of the current ratio;

determining a series of p variations of acceleration and torque between two given times;

calculating the weight of the vehicle by a technique of identification of recursive least squares of the variations of acceleration and torque.

7. Motor vehicle, characterized in that it employs the method of elimination of the pumping phenomenon according to claim 5.

8. Method according to claim 1, characterized in that the determination of the weight of the vehicle includes the stages consisting of:

calculating the acceleration of the vehicle from the measured speed of the vehicle;

calculating the wheel torque from the angle of opening of the throttle valve engine speed and reduction ratio of the transmission on the current ratio;

determining a series of $\rho$ variations of acceleration and torque between two given times;

calculating the weight of the vehicle by a technique of identification of recursive least squares of the variations of acceleration and torque.

9. Method according to claim 8, characterized in that the stage of calculation of the weight of the vehicle includes a stage of calculation of a gross weight calculated for each variation of acceleration and torque, followed by a stage of calculation of weight by calculation of a recursive average from the successive gross weight information.

10. Method according to claim 8, characterized in that the recursive least squares of the variations of acceleration and torque are calculated for variations of acceleration and torque obtained when the brakes of the vehicle are not activated, when the variation of angle of opening of the throttle valve between the given times is below a given threshold, and when the products of the variations of torque by the variations of acceleration are higher than a predetermined positive threshold.

11. Method according to claim 9, characterized in that the stage of calculation and acceleration of the vehicle from the measured speed of the vehicle includes the stages consisting of:

filtering the measured speed information by means of a first-order digital low-pass filter, so as to obtain filtered speed information;

calculating the numerical derivative of the filtered speed information so as to obtain vehicle acceleration information;

filtering the vehicle acceleration information by means of a digital low-pass filter, so as to obtain filtered acceleration information from the vehicle.

12. Method of claim 9, characterized in that the stage of calculation of the wheel torque includes the stages consisting of:

calculating the wheel torque by multiplying the gear reduction ratio of the vehicle on the current ratio N by the engine torque;

filtering the wheel torque by means of low-pass filters so as to obtain wheel torque information in phase with the filtered acceleration information from the vehicle.

13. Motor vehicle, characterized in that it employs the method of elimination of the pumping phenomenon according to claim 9.

14. Method according to claim 8, characterized in that the series of p variations of acceleration and torque is calculated between two times spaced by approximately 0.5 second to 2.5 seconds.

15. Method according to claim 8, characterized in that the stage of calculation of acceleration of the vehicle from the measured speed of the vehicle includes the stages consisting of:

filtering the measured speed information by means of a first-order digital low-pass filter, so as to obtain filtered speed information;

calculating the numerical derivative of the filtered speed information so as to obtain vehicle acceleration information;

filtering the vehicle acceleration information by means of a digital low-pass filter, so as to obtain filtered acceleration information from the vehicle.

16. Motor vehicle, characterized in that it employs the method of elimination of the pumping phenomenon according to claim 15.

17. Motor vehicle, characterized in that it employs the method of elimination of the pumping phenomenon according to claim 8.

18. Method according to claim 8, characterized in that the stage of calculation of the wheel torque includes the stages consisting of:

calculating the wheel torque by multiplying the gear reduction ratio of the vehicle on the current ratio N by the engine torque;

filtering the wheel torque by means of low-pass filters so as to obtain wheel torque information in phase with the filtered acceleration information from the vehicle.

19. Motor vehicle, characterized in that it employs the method of elimination of the pumping phenomenon according to claim 18.

20. Motor vehicle, characterized in that it employs the method of elimination of the pumping phenomenon according to claim 1.

* * * * *